United States Patent
Zheng et al.

(10) Patent No.: US 9,903,525 B2
(45) Date of Patent: Feb. 27, 2018

(54) INSULATED FLUID CONDUIT

(71) Applicant: GENERAL ELECTRIC COMPANY, Schenectady, NY (US)

(72) Inventors: Huabing Zheng, Niskayuna, NY (US); Donald Joseph Buckley, Jr., Schenectady, NY (US); Scott Michael Miller, Clifton Park, NY (US); Chad Eric Yates, Houston, TX (US); Juan Alberto Rivas Cardona, Spring, TX (US)

(73) Assignee: General Electronic Company, Niskayuna, NY (US)

( * ) Notice: Subject to any disclaimer, the term of this patent is extended or adjusted under 35 U.S.C. 154(b) by 0 days.

(21) Appl. No.: 15/224,782

(22) Filed: Aug. 1, 2016

(65) Prior Publication Data
US 2017/0059080 A1    Mar. 2, 2017

Related U.S. Application Data

(63) Continuation-in-part of application No. 14/840,678, filed on Aug. 31, 2015.

(51) Int. Cl.
F16L 59/14    (2006.01)
F16L 59/02    (2006.01)
(Continued)

(52) U.S. Cl.
CPC ............. *F16L 59/143* (2013.01); *B32B 1/00* (2013.01); *B32B 1/08* (2013.01); *B32B 3/00* (2013.01);
(Continued)

(58) Field of Classification Search
CPC ....................................................... F16L 59/14
(Continued)

(56) References Cited

U.S. PATENT DOCUMENTS

| 3,904,111 A | 9/1975 | Petersson |
| 4,429,213 A | 1/1984 | Mathieu |

(Continued)

FOREIGN PATENT DOCUMENTS

| DE | 10256553 A1 | 6/2004 |
| EP | 3223408 A2 | 5/1987 |

OTHER PUBLICATIONS

Denniel et al., "Review of Flow Assurance Solutions for Deepwater Fields", Offshore Technology Conference, Number of pp. 10, May 3-6, 2004, Houston, Texas.

(Continued)

*Primary Examiner* — Craig Schneider
*Assistant Examiner* — David Deal
(74) *Attorney, Agent, or Firm* — Pabitra K. Chakrabarti

(57) ABSTRACT

The present invention provides an insulated fluid conduit useful in facilities in which a hot fluid susceptible to one or more deleterious phase changes in response to heat loss to a cold environment is transported. Such conduits may be particularly well suited to improve thermal control in subsea hydrocarbon production operations. The fluid conduit includes an inner first insulating layer containing a first polymer matrix, and a first phase change material undergoing a phase change at $T_1$. The fluid conduit includes an outer second insulating layer containing a second polymer matrix, and a second phase change material undergoing a phase change at $T_2$, wherein $T_1$ is greater than $T_2$. One or more barrier layers inhibit migration of the phase change material from the insulation layers and into the environment. In one or more embodiments, the phase change material is present as a microencapsulated phase change material.

15 Claims, 7 Drawing Sheets

(51) Int. Cl.
| | |
|---|---|
| B32B 5/18 | (2006.01) |
| B32B 5/22 | (2006.01) |
| B32B 7/00 | (2006.01) |
| B32B 7/02 | (2006.01) |
| B32B 25/00 | (2006.01) |
| B32B 25/04 | (2006.01) |
| B32B 25/14 | (2006.01) |
| B32B 25/20 | (2006.01) |
| B32B 27/00 | (2006.01) |
| B32B 27/06 | (2006.01) |
| B32B 27/28 | (2006.01) |
| B32B 27/32 | (2006.01) |
| B32B 27/38 | (2006.01) |
| B32B 27/40 | (2006.01) |
| B32B 1/00 | (2006.01) |
| B32B 1/08 | (2006.01) |
| B32B 3/00 | (2006.01) |
| B32B 3/20 | (2006.01) |
| B32B 3/26 | (2006.01) |

(52) U.S. Cl.
CPC .............. *B32B 3/20* (2013.01); *B32B 3/26* (2013.01); *B32B 5/18* (2013.01); *B32B 5/22* (2013.01); *B32B 7/00* (2013.01); *B32B 7/02* (2013.01); *B32B 25/00* (2013.01); *B32B 25/04* (2013.01); *B32B 25/14* (2013.01); *B32B 25/20* (2013.01); *B32B 27/00* (2013.01); *B32B 27/06* (2013.01); *B32B 27/28* (2013.01); *B32B 27/286* (2013.01); *B32B 27/32* (2013.01); *B32B 27/38* (2013.01); *B32B 27/40* (2013.01); *F16L 59/029* (2013.01); *B32B 2266/00* (2013.01); *B32B 2266/02* (2013.01); *B32B 2266/0278* (2013.01); *B32B 2266/06* (2013.01); *B32B 2307/30* (2013.01); *B32B 2307/304* (2013.01); *B32B 2307/50* (2013.01); *B32B 2307/712* (2013.01); *B32B 2307/7242* (2013.01); *B32B 2307/7244* (2013.01); *B32B 2307/7246* (2013.01); *B32B 2307/7248* (2013.01); *B32B 2307/732* (2013.01); *B32B 2597/00* (2013.01)

(58) Field of Classification Search
USPC .................. 138/146, 149, 140, 141, 137
See application file for complete search history.

(56) References Cited

U.S. PATENT DOCUMENTS

| | | | |
|---|---|---|---|
| 4,454,248 A | | 6/1984 | Pollock et al. |
| 6,000,438 A | * | 12/1999 | Ohrn .................. E21B 17/01 |
| | | | 138/149 |
| 6,746,761 B2 | | 6/2004 | Janoff |
| 7,105,104 B2 | | 9/2006 | Chomard et al. |
| 7,226,243 B2 | | 6/2007 | Lee et al. |
| 7,745,379 B2 | | 6/2010 | Collins |
| 7,896,033 B2 | | 3/2011 | Hallot et al. |
| 8,430,169 B2 | | 4/2013 | Stoisits et al. |
| 9,057,465 B2 | * | 6/2015 | Glejbol; Kristian .... F16L 11/08 |
| 2003/0131623 A1 | * | 7/2003 | Suppes .................. C09K 5/063 |
| | | | 62/324.1 |
| 2005/0208300 A1 | * | 9/2005 | Magill .................... D01D 5/24 |
| | | | 428/364 |
| 2005/0214547 A1 | | 9/2005 | Pasquier et al. |
| 2010/0043906 A1 | | 2/2010 | Jackson et al. |
| 2011/0186169 A1 | | 8/2011 | Pionetti et al. |
| 2011/0232799 A1 | | 9/2011 | Tribout et al. |
| 2012/0261019 A1 | | 10/2012 | Glejbol |
| 2014/0030458 A1 | | 1/2014 | Van Eibergen et al. |
| 2014/0246374 A1 | | 9/2014 | Shojaei-Zadeh et al. |
| 2014/0311614 A1 | | 10/2014 | Edmondson et al. |
| 2016/0018049 A1 | | 1/2016 | Yodogawa et al. |

OTHER PUBLICATIONS

Janoff et al., "Prediction of Cool Down Times and Designing of Insulation for Subsea Production Equipment", Offshore Technology Conference, Number of pp. 6, 2004, Houston, Texas.

Parsazadeh et al., "Thermal Insulation With Latent Energy Storage for Flow Assurance in Subsea Pipelines", ASME 2015 34th International Conference on Ocean, Offshore and Arctic Engineering, vol. 5B, pp. 6, May 31-Jun. 5, 2015.

Bell et al., "The McPIPE™ Extended Cooldown System: One week (and more) of Safe Cooldown", 14th Deep Offshore Technology Conference, New Orleans, Louisiana, Nov. 13-15, 2002.

International Search Report and Written Opinion issued in connection with corresponding Application No. PCT/US2016/048002 dated Nov. 3, 2016.

* cited by examiner

INSULATED FLUID CONDUIT

CROSS REFERENCE TO RELATED APPLICATIONS

This application is a continuation-in-part and claims priority to U.S. patent application Ser. No. 14/840,678 filed Aug. 31, 2015 for "INSULATED FLUID CONDUIT", which is hereby incorporated by reference in its entirety.

BACKGROUND

The present invention relates to equipment useful in fluid production operations taking place in cold environments. In particular, the invention relates to insulated fluid conduits, their manufacture, and systems containing them.

Many beneficial human manufacturing and energy production activities involve the transport of a heated fluid in a fluid conduit situated in a cold environment. Where the fluid is susceptible to solidification or becoming unmanageably viscous because of heat loss to the cold environment, prudent engineering practices include insulating pipes against passive heat loss to the environment and/or actively heating the fluid conduit along its length.

Heat loss and its attendant consequences may become particularly severe where flow of the heated fluid through the conduit is interrupted. The conduit containing the heated liquid gradually cools via heat loss to the environment and the fluid may solidify or become unmanageably viscous within the conduit. When flow is resumed, the thermally depleted matter within the fluid conduit may prevent or delay the resumption of fluid flow within the fluid conduit. Problems can be particularly severe when the heated fluid readily crystallizes on cooling, as is the case with relatively pure phenol (melting point 43° C., CAS No. 108-95-2) or otherwise forms solids on cooling. (See natural gas hydrates for example.)

Thus, heat retention within fluid conduits may be critical to the efficient operation of facilities in which a hot fluid susceptible to one or more deleterious phase changes in response to heat loss to a cold environment is transported. There is at present a particular need for improved thermal control in subsea hydrocarbon production operations in which hot production fluids may undergo one or more deleterious phase changes as a result of heat loss to the cold subsea environment. The present invention provides one or more embodiments enabling improved thermal control in such environments.

BRIEF DESCRIPTION

In one embodiment, the present invention provides an insulated fluid conduit comprising: (a) a conduit inner surface defining a flow channel; (b) a conduit outer surface; (c) a first insulating layer comprising a first phase change material dispersed in a first polymer matrix; (d) a second insulating layer disposed upon the first insulating layer, the second insulating layer comprising a second phase change material dispersed in a second polymer matrix; and (e) at least one barrier layer configured to inhibit migration of one or more of the first and second phase change materials into the environment; wherein the first phase change material has a melting point $T_1$ and the second phase change material has a melting point $T_2$, and $T_1$ is greater than $T_2$.

In an alternate embodiment, the present invention provides an insulated fluid conduit comprising: (a) a conduit inner surface defining a flow channel; (b) a conduit outer surface; (c) a first insulating layer comprising a silicone rubber and a first phase change material; (d) a second insulating layer comprising a silicone rubber and a second phase change material; and (e) at least one barrier layer configured to inhibit migration of one or more of the first and second phase change materials into the environment; wherein the first phase change material has a melting point $T_1$ and the second phase change material has a melting point $T_2$, and $T_1$ is greater than $T_2$.

In yet another embodiment, the present invention provides an insulated fluid conduit comprising: (a) a conduit inner surface defining a flow channel; (b) a conduit outer surface; (c) a first insulating layer comprising a first phase change material dispersed in a first polymeric matrix; (d) a second insulating layer comprising a second phase change material dispersed in a second polymeric matrix; and (e) at least one barrier layer configured to inhibit migration of one or more of the first and second phase change materials into the environment; wherein the first phase change material has a melting point $T_1$ and the second phase change material has a melting point $T_2$, and $T_1$ is greater than $T_2$, and wherein at least one of the first polymeric matrix and the second polymeric matrix is configured as an open cell foam defining a network of voids.

BRIEF DESCRIPTION OF THE DRAWING FIGURES

Various features, aspects, and advantages of the present invention will become better understood when the following detailed description is read with reference to the accompanying drawings in which like characters may represent like parts throughout the drawings. Unless otherwise indicated, the drawings provided herein are meant to illustrate key inventive features of the invention. These key inventive features are believed to be applicable in a wide variety of systems which comprising one or more embodiments of the invention. As such, the drawings are not meant to include all conventional features known by those of ordinary skill in the art to be required for the practice of the invention.

DETAILED DESCRIPTION

Figure 1:
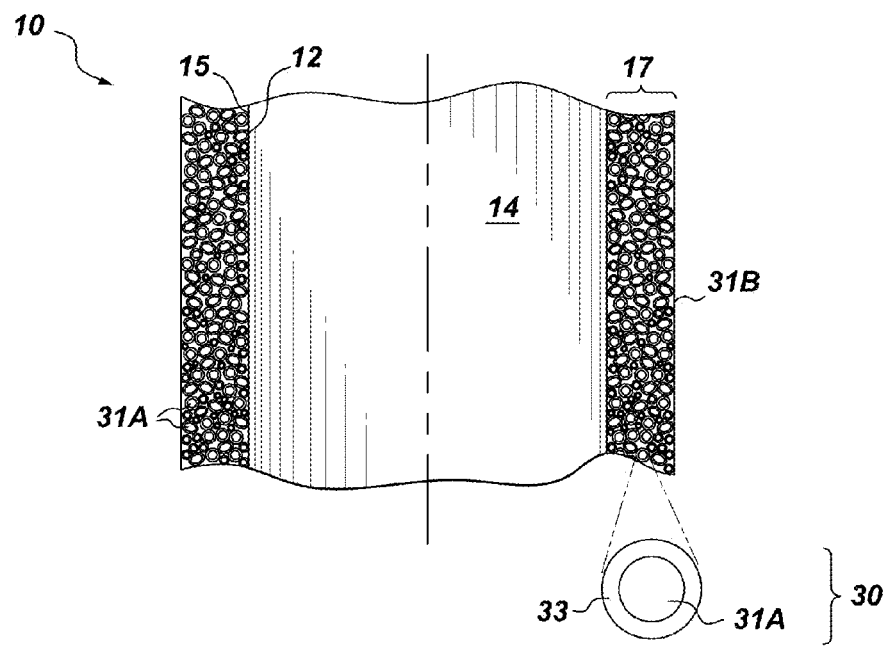
FIG. 1 illustrates a substructure within one or more embodiments of the present invention.

In the following specification and the claims, which follow, reference will be made to a number of terms, which shall be defined to have the following meanings.

The singular forms "a", "an", and "the" include plural referents unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As noted, in one embodiment, the present invention provides an insulated fluid conduit comprising (a) a conduit inner surface defining a flow channel; (b) a conduit outer surface; (c) a first insulating layer comprising a first polymer matrix and a first phase change material; (d) a second insulating layer comprising a second polymer matrix and a second phase change material; and (e) at least one barrier layer configured to inhibit migration of one or more of the first and second phase change materials into the environment; wherein the first phase change material has a melting point $T_1$ and the second phase change material has a melting point $T_2$, and $T_1$ is greater than $T_2$. The fluid conduit may be of any type which may be used to transport or control the flow of a fluid, such as a production fluid from a hydrocarbon reservoir. Such conduits include pipes, valves, manifolds, joints, Christmas trees, risers and tie-backs such as may be useful in subsurface aquatic environments adjacent to a subsea hydrocarbon reservoir. Such conduits find use as well in surface environments where the ambient temperature may be exceedingly cold.

The insulated fluid conduit comprises a first insulating layer comprising a first phase change material dispersed in a first polymer matrix and a second insulating layer comprising a second phase change material dispersed within a second polymer matrix. The first insulating layer may be disposed directly on the outer surface of the fluid conduit, on an adhesive tie layer in direct contact with the fluid conduit outer surface, on a thermally conductive layer designed to promote heat exchange between the flow channel of the fluid conduit and the first insulating layer, or on a combination of two or more of such intervening layers. The insulated fluid conduit is, however, configured such that as hot fluid passes through the flow channel of the fluid conduit sufficient heat is transferred to the first and second insulating layers to cause the first phase change material and the second phase change material to undergo at least one substantially reversible phase change. Typically, the phase changes taking place as heat from a hot fluid passing through the fluid conduit is absorbed by the first insulating layer and the second insulating layer are the melting of the first phase change material at a temperature $T_1$ and the melting of the second phase change material at a temperature $T_2$. More generally, however, the phase changes which the first and second phase change materials undergo can be any substantially reversible phase change which absorbs heat in a forward direction and releases heat in a reverse direction. Suitable phase changes include phase changes occurring as when, for example, a crystalline solid undergoes a reversible first heat absorbing phase change to a liquid crystalline phase, and a reversible second heat absorbing phase change to true liquid phase, and thereafter releases heat as the true liquid phase cools and returns to the liquid crystalline phase, and releases additional heat as the liquid crystalline phase further cools and returns to the original crystalline solid phase. In one or more embodiments, the phase change materials are relatively simple organic materials such as waxes, which are crystalline solids when cold and undergo a reversible phase change to a molten state when heated and remain in the molten state through the onset of a cool down period. As the molten first phase change material and second phase change material cool and undergo crystallization, heat is released thereby lengthening the duration of the cool down period. It has been found experimentally that the length of such cool down period may be maximized when the temperature $T_1$ at which the first phase change material undergoes its greatest heat absorbing/releasing reversible phase change is greater than the temperature $T_2$ at which the second phase change material undergoes its greatest heat absorbing/releasing reversible phase change.

The first polymer matrix and the second polymer matrix may comprise any polymeric material in which the first phase change material and second phase change material may be dispersed. In one or more embodiments, the first polymer matrix and the second polymer matrix are essentially identical. In an alternate set of embodiments, the first polymer matrix and the second polymer matrix are essentially non-identical and differ with respect to one or more of polymer class, polymer structure and polymer molecular weight. In one or more embodiments, at least one of the first polymer matrix and the second polymer matrix is configured as an open cell foam. In one or more alternate embodiments, at least one of the first polymer matrix and the second polymer matrix is substantially non-porous, meaning that any voids present in the polymer matrix represent less than five percent of the total volume of the polymer matrix.

In one or more alternate embodiments, at least one of one of the first polymer matrix and the second polymer matrix comprises a polyolefin. Suitable polyolefins include polyethylene, polypropylene and polyolefin block copolymers such as polystyrene-polybutylene block copolymers. In one or more embodiments, at least one of the first polymer matrix and the second polymer matrix is a porous polyolefin such as an open cell polyethylene foam, an open cell polypropylene foam, or an open cell polyolefin block copolymeric foam.

In one or more embodiments, at least one of the first polymer matrix, the second polymer matrix and the barrier layer comprises a polyurethane such as are known in the art. In one or more embodiments, at least one of the first polymer matrix and the second polymer matrix is an open cell polyurethane foam such as are known in the art. In one or more embodiments, at least one of the first polymer matrix and the second polymer matrix is a multilayer reticulated polyurethane foam.

In one or more embodiments, at least one of the first polymer matrix, the second polymer matrix and the barrier layer comprises a polyepoxide such as are known in the art. In one or more embodiments, at least one of the first polymer matrix and the second polymer matrix is an open cell polyepoxide foam such as are known in the art, for example polyepoxide foams such as those described in U.S. Pat. No. 4,454,248, US Patent application US20140246374 and references cited therein.

In one or more embodiments, at least one of the first polymer matrix, the second polymer matrix and the barrier layer comprises a polyimide such as are known in the art. In one or more embodiments, at least one of the first polymer matrix and the second polymer matrix is an open cell polyimde foam such as are known in the art, for example polyimide foams sold under the trade names SOLIMIDE and AMS Polyimide Foams.

In one or more embodiments, at least one of the first polymer matrix, the second polymer matrix and the barrier layer comprises a polyetherimide such as are known in the art, for example ULTEM polyetherimide available through SABIC Innovative Plastics. In one or more embodiments, at least one of the first polymer matrix and the second polymer matrix is an open cell polyetherimide foam such as are known in the art, for example polyetherimide foams sold under the trade name ULTEM foam.

In one or more embodiments, at least one of the first polymer matrix, the second polymer matrix, and the barrier layer comprises a silicone rubber. In one or more embodiments, at least one of the first polymer matrix and the second polymer matrix is a silicone rubber configured as open cell foam defining a network of voids configured to contain a phase change material.

In one or more embodiments, the first insulating layer may be applied to a surface of the conduit as a composition comprising a curable polymer precursor and the first phase change material. The curable polymer precursor is then cured in place to provide a cured organic polymer matrix containing the first phase change material dispersed within it. In one or more embodiments, the curable polymer precursor is a curable silicone composition which affords a silicone rubber upon curing. In an alternate set of embodiments, the curable polymer precursor is a curable epoxy composition which affords a polyepoxide upon curing. In yet another set of embodiments, the curable polymer precursor is a curable urethane composition which affords a polyurethane upon curing. One or more barrier layers may be applied to surfaces of the cured first insulating layer to inhibit migration of the first phase change material out of the first insulating layer.

In one or more embodiments, the first insulating layer may be applied to the conduit surface as an article, such as a sleeve, a cylinder, a gasket, a tape, or a sheet susceptible to being cut, comprising a first phase change material dispersed within the first polymer matrix.

Once the first insulating layer is in place, the second insulating layer may be applied to the outer surface of the first insulating layer as a curable polymer precursor comprising the second phase change material, or as an insulating article, for example a sleeve, a cylinder, a gasket, a tape, or a sheet susceptible to being cut, comprising the second phase change material dispersed within the second polymer matrix. One or more barrier layers may be applied to surfaces of the second insulating layer to inhibit migration of the second phase change material out of the second insulating layer.

In an alternate set of embodiments, the first and second insulating layers are applied to the outer surface of the fluid conduit in a single step by applying a multilayer insulating article comprising both a first insulating layer comprising a first phase change material dispersed in a first polymer matrix, and a second insulating layer comprising a second phase change material dispersed in a second polymer matrix. In one or more embodiments, the multilayer insulating article is a multilayer sleeve, a multilayer cylinder, a multilayer gasket, a multilayer tape, or a multilayer sheet susceptible to being cut. The multilayer insulating article may comprise one or more barrier layers in order to inhibit mixing of the first and second phase change materials and to prevent loss of such phase change materials to the environment.

As noted, in one or more embodiments, the first insulating layer and/or the second insulating layer comprises a silicone rubber which is ductile over a wide temperature range (e.g. −40 to 150° C.), is hydrolytically robust, and has good heat resistance. Where a curable silicone rubber precursor composition is employed, the formulation to be applied to the conduit as a first insulating layer or a second insulating layer should be of sufficient viscosity to enable its application by trowelling and be resistant to sagging. Cure times are ideally rapid such that multiple layers may be conveniently applied and cured. Suitable silicone rubber precursors are available commercially and include XTI-1003 available from Dow Corning, M4642 available from Wacker Chemie, and Addisil UV 60 EX available from Momentive.

In one or more embodiments, either or both of the first insulating layer and the second insulating layer comprise a cured silicone rubber which is an open cell foam defining a network of voids and wherein the phase change material is disposed therein. Suitable open cell foams include commercially available silicone foam materials such as open cell sponge rubbers available from Western Rubber & Supply, Inc. and Stockwell Elastomerics, Inc., and such as are disclosed in EP0223408 A2 and elsewhere within the art. The open cell silicone foam may be prepared from a reactive mixture of silicone rubber precursors applied as the first insulating layer or second insulating layer and reacted in place followed by infusion of the phase change material into the voids defined by the open cell foam, and the application of an appropriate barrier layer to the exposed surfaces of the open cell silicone foam. Alternately, the open cell silicone foam may be applied as a foamed article, for example a silicone foam sleeve comprising one or more phase change materials within the open cells and/or channels of the foam. A suitable barrier layer may be applied to one or more surfaces of the open cell silicone foam to prevent migration of the phase change material out of the silicone foam and into the environment or into an adjacent insulating layer containing a different phase change material.

Suitable phase change materials include materials having melting points below the typical operating temperature of the conduit, but above the temperature of the ambient environment in which the insulated fluid conduit is deployed. In one embodiment, the first and second insulating layers comprise respectively a first phase change material and a second phase change material having melting points $T_1$ and $T_2$ in a range from about 10 to about 100° C. wherein $T_1$ is greater than $T_2$. Suitable phase change materials include low molecular weight hydrocarbon waxes and fatty acid waxes. Table 1 provides examples of suitable phase change materials and physical properties related to the phase change behavior of such phase change materials. In one or more embodiments, the phase change material comprises one or more of a normal hydrocarbon selected from the group consisting of hexadecane, octadecane, and eicosane. In Table 1, Entry 1 is a paraffin wax phase change material comprised chiefly of octadecane ((n-C18). Entry 2 is a paraffin wax phase change material comprised chiefly of hydrocarbons containing from 19 to 36 carbon atoms. Entries 3 and 4 are fatty acid waxes comprised chiefly of caprylic acid and palmitic acid respectively. Melting points are given in degrees centigrade. Cp represents the heat capacity of the phase change material in the solid and liquid states and is given in kilojoules per kilogram. The term LHF represents the latent heat of fusion of the phase change material. K(W/mk) represents the thermal conductivity of phase change material in the solid and liquid states.

TABLE 1

Suitable Phase Change Materials

| Entry | Mp | Cp (kj/kg) solid | Cp (kj/kg) liquid | LHF (kj/kg) | K (W/mK) solid | K (W/mK) liquid | Density (kg/m³) liquid | Density (kg/m³) solid |
|---|---|---|---|---|---|---|---|---|
| 1 n-$C_{18}$ | 28 | 2.2 | 2.2 | 223 | 0.36 | 0.15 | 774 | 814 |
| 2 $C_{19}$-$C_{36}$ | 58 | 2.6 | 3.0 | 155 | 0.23 | 0.16 | 768 | 885 |
| 3 caprylic acid | 16 | 2.1 | 1.9 | 141 | 0.24 | 0.14 | 862 | 1033 |
| 4 palmitic acid | 63 | 2.1 | 2.3 | 190 | 0.24 | 0.16 | 847 | 989 |

In one or more embodiments, the phase change material is encapsulated prior to being dispersed in a first or second polymer matrix. Under such circumstances, the need for a separate barrier layer at the outer surfaces of the first and/or second polymer matrix is reduced or eliminated entirely since each domain comprising a phase change material is isolated within the shell which encapsulates the phase change material. A variety of microencapsulated and macroencapsulated phase change materials are available commercially, for example through Microtek, Inc. In one or more embodiments, either or both of the first and second insulating layers comprise an organic polymer, such as a cured silicone rubber, and a microencapsulated phase change material comprising a mixture of octadecane and eicosane. One such microencapsulated phase change material, MPCM32D available from Microtek, shows outstanding thermal stability up to 250° C.

Suitable barrier layers for use according to one or more embodiments of the present invention include barrier materials which are impermeable with respect to the phase change material. Suitable barrier materials include cross-linked silicone materials such as silicone hard coat materials known in the art. Suitable barrier layers may also include the same polymeric materials constituting either or both of the first insulating layer and the second insulating layer, but not containing the phase change material. For example, in one embodiment, the first insulating layer of an insulated conduit provided by the present invention may comprise a cured silicone rubber prepared from a curable formulation comprising Dow Corning's curable XTI-1003 RTV Silicone Rubber Insulation having a first phase change material disposed within it. The same insulated fluid conduit may constitute a barrier layer prepared from Dow Corning XTI-1003 RTV Silicone Rubber Insulation without the inclusion of the first phase change material. In an alternate embodiment, the barrier layer is prepared from a UV curable silicone-containing material such as Addisil UV 60 EX.

Turning now to the figures, FIG. 1 represents a portion (second insulating layer not shown) of an insulated fluid conduit 10 provided by the present invention having a fluid conduit inner surface 12 and a fluid conduit outer surface 15. The fluid conduit inner surface 12 defines a flow channel 14 through which a fluid may be caused to flow. A first insulating layer 17 is disposed on the outer surface 15 of the fluid conduit. In the embodiment shown, the first insulating layer comprises a first polymer matrix 31B configured as a continuous phase. A microencapsulated phase change material 30 is dispersed within the first polymer matrix as a discontinuous phase of the first insulating layer. The microencapsulated phase change material 30 comprises the first phase change material 31A together with a barrier layer 33 (shell) which surrounds the first phase change material in discrete domains dispersed within the first polymer matrix.

Figure 2:
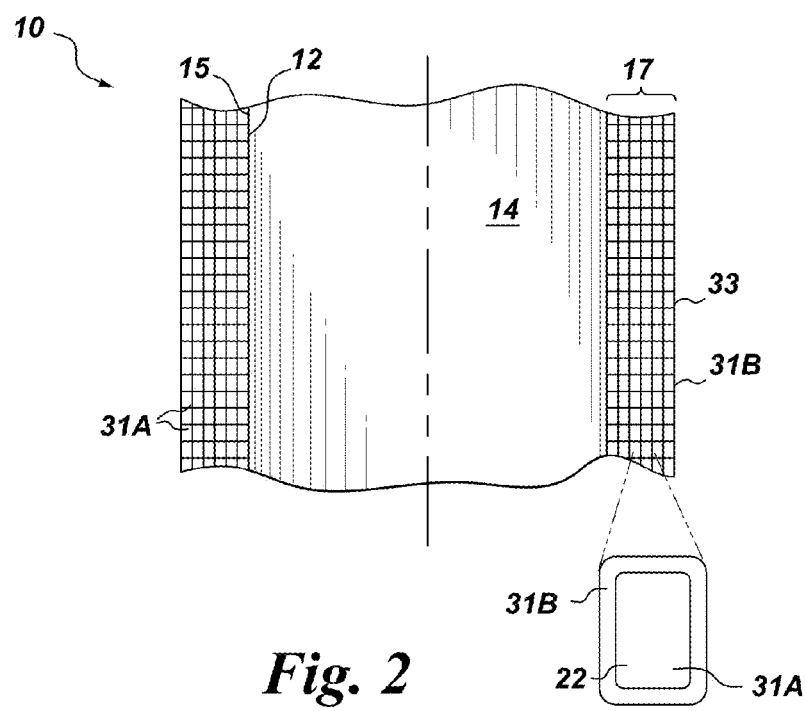
FIG. 2 illustrates a substructure within one or more embodiments of the present invention.

Referring to FIG. 2, the figure represents a portion (second insulating layer not shown) of a fluid conduit 10 provided by the present invention having a fluid conduit inner surface 12 and a fluid conduit outer surface 15. The fluid conduit inner surface 12 defines a flow channel 14 through which a fluid may be caused to flow. A first insulating layer 17 is disposed on the outer surface 15 of the fluid conduit. In the embodiment shown, the first insulating layer comprises a first polymer matrix 31B which is a silicone rubber configured as an open cell foam defining a network of voids 22. A first phase change material 31A is dispersed within voids of the silicone rubber as a second phase of the first insulating layer. A barrier layer 33 which covers the outer surface of first insulating layer 17 prevents adventitious contact of the phase change material with the second insulating layer (not shown).

Figure 3:
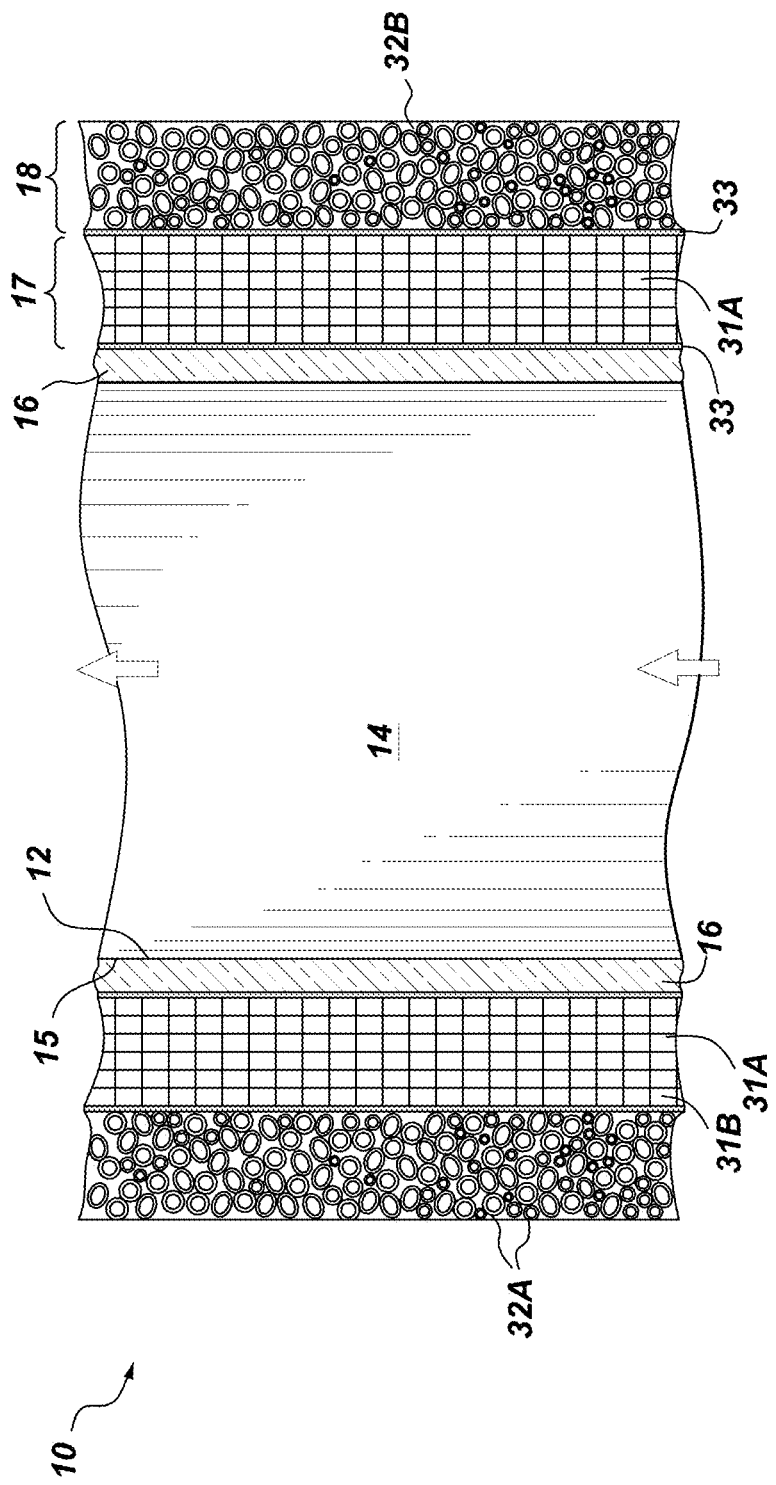
FIG. 3 illustrates one or more embodiments of the present invention.

Referring to FIG. 3, the figure represents an insulated fluid conduit 10 provided by the present invention. In the embodiment shown, the fluid conduit comprises an inner surface 12 which defines a flow channel 14 and an outer surface 15 upon which surface are disposed a thermally conductive layer 16 and first and second insulating layers 17 and 18 respectively. Thermally conductive layer 16 is an optional feature and FIG. 3 is meant to illustrate both an embodiment comprising such a layer 16, and an embodiment not comprising such a layer 16. The purpose of the thermally conductive layer 16 is to provide for more efficient heat exchange between the first and second insulating layers 17 and 18, and the outer surface 15 of the insulated fluid conduit. For example outward heat transfer from a hot production fluid flowing through flow channel 14 to the phase change materials 31A and 32A present in insulating layers 17 and 18 may be enhanced by the presence of thermally conductive layer 16. Similarly, inward heat transfer from the insulating layers to the inner and outer surfaces 12 and 15 of the fluid conduit may be enhanced by the presence of the thermally conductive layer 16 during periods of operation wherein flow through the insulated fluid conduit is reduced or stopped. Suitable thermally conductive layers include metal coatings such as nickel deposited by an electro-less nickel plating technique. Other suitable materials include thermally conductive adhesive materials as are used in support of current technologies, for example thermally conductive epoxy, silicone and elastomeric adhesives available commercially from suppliers such as Masterbond, Dow Corning and Epoxies ETC. In the embodiment shown, the first insulating layer 17 comprises a first polymer matrix 31B configured as an open cell foam defining a network of voids 22 (See FIG. 2) containing the first phase change materials 31A. In one or more embodiments, the thermally conductive layer 16 functions as an adhesive and secures the first insulating layer 17 to the outer surface 15 of the fluid conduit. Barrier layers 33 inhibit or prevent movement of first phase change material 31A from voids 22. A second insulating layer 18 is disposed upon the outer barrier layer 33 of first insulating layer 17. This second insulating layer comprises a microencapsulated phase change material 30 (See FIG. 4) configured as shown in FIG. 1, and shown in FIG. 3 as the round and ovoid cell-like structures dispersed within second polymer matrix 32B.

Figure 4:
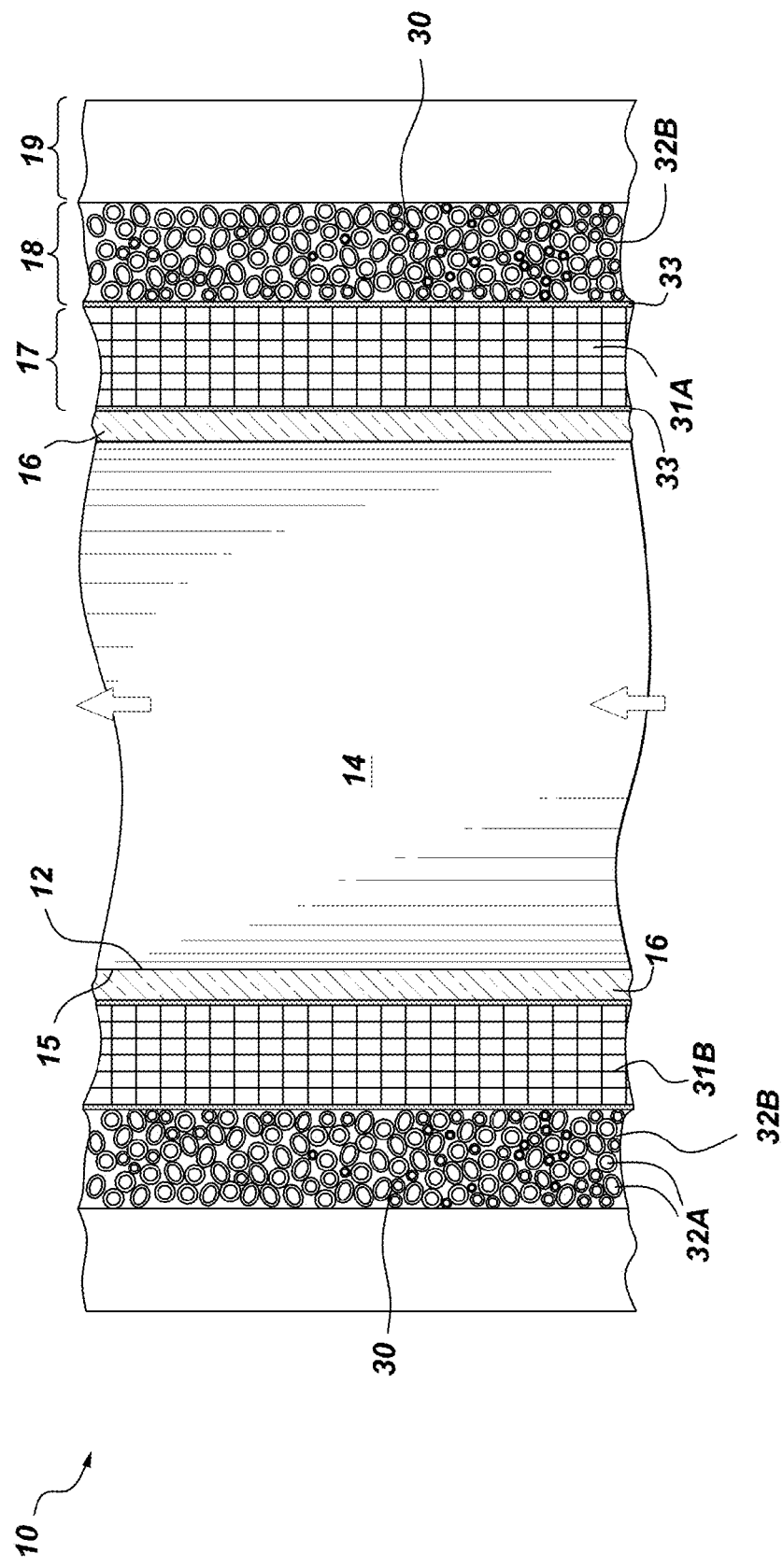
FIG. 4 illustrates one or more embodiments of the present invention.

Referring to FIG. 4, the figure represents an insulated fluid conduit 10 configured as in FIG. 3 but further comprising a third insulating layer 19 disposed around second insulating layer 18. In the embodiment shown, third insulating layer 19 does not contain a phase change material and serves to inhibit or prevent contact of the underlying second insulating layer with the environment. In one or more embodiments, the third insulating layer acts to seal the underlying insulating layers and the phase change material contained within such layers within the structure of the insulated fluid conduit. In an alternate set of embodiments third insulating layer 19 may comprise one or more phase change materials.

As will be appreciated by those of ordinary skill in the art, embodiments of the present invention comprise at least two insulating layers, but as indicated in the discussion of FIG. 4, may comprise three or more insulating layers. Thus in one set of embodiments the insulated fluid conduit comprises at least four insulating layers, each layer comprising at least one phase change material. Table 3 of the Experimental Part depicts such additional embodiments.

EXPERIMENTAL PART

Laboratory tests were carried out on model insulating systems prepared and tested as described herein. Performance simulation experiments were also conducted and revealed the surprising benefits of certain configurations of the phase change materials and first and second insulating layers.

Test formulations were prepared by hand mixing approximately 100 grams of an addition curable silicone rubber with 10 grams its curing agent (Dow Corning XTI-1003 RTV Silicone Rubber Insulation) together with 30 grams, 50 grams or 0 grams (Control) of an encapsulated phase change material MPCM32D. The uncured formulation was transferred to a 100 mL plastic beaker such that the beaker was substantially filled with the uncured formulation. A thermocouple probe was then positioned as closely as possible to the center of the beaker and held in that position for 24 hours at room temperature to provide the fully cured product comprising the cured silicone rubber, the encapsulated phase change material and the thermocouple probe. The plastic beaker was then cut away from the cured formulation. The beaker-shaped cured formulation was then heated in an oven at 50° C. for 24 hours and then removed and placed in a constant temperature bath (21-23° C. or 4° C.) and allowed to cool to constant temperature and the heat loss profile of the cured formulation was recorded. All tests were carried out in duplicate.

Example 1

Figure 5:
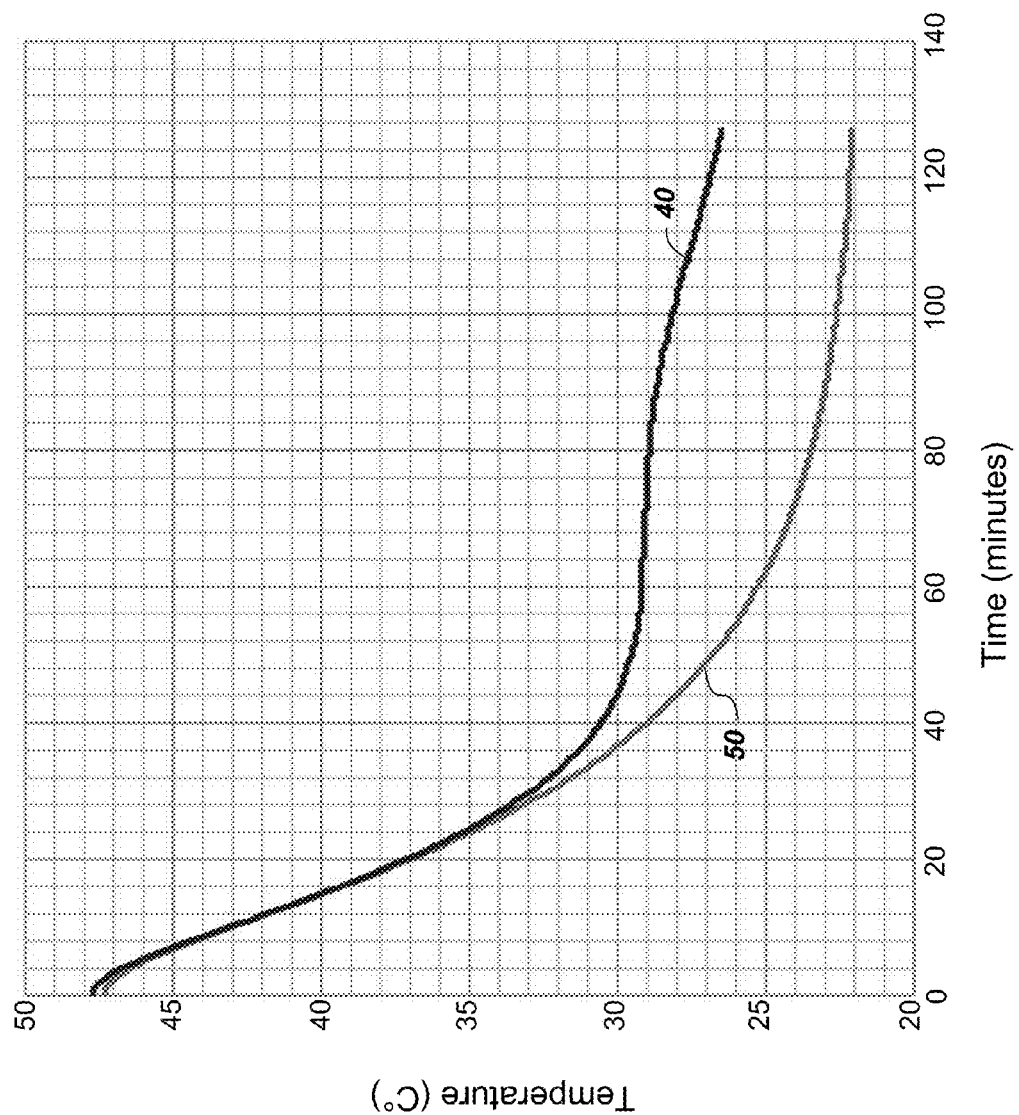
FIG. 5 illustrates the performance characteristics of a model insulation system relative to a control.

The insulation formulation was prepared, cured and tested as described above. The uncured formulation contained approximately 30 grams of the micro encapsulated phase change material MPCM32D purchased from Microtek. FIG. 5 illustrates the cool down behavior of the product insulation 40 relative to the control 50 which contained no phase change material but was otherwise identical to the product insulation. The data indicate a divergence of heat loss behavior, relative to the control, at approximately 33° C., a temperature close to the nominal melting point (32° C.) of the phase change material present in MPCM32D. It was observed that the time required for the product insulation 40 to cool from 30° C. to 28° C. was approximately 59.5 minutes, whereas the control 50 cooled from 30° C. to 28° C. in just 7 minutes. The time required for the product insulation 42 to cool from 47° C. to 23° C. was significantly greater (>127 minutes) than that observed for the control (88 minutes).

Example 2

Figure 6:
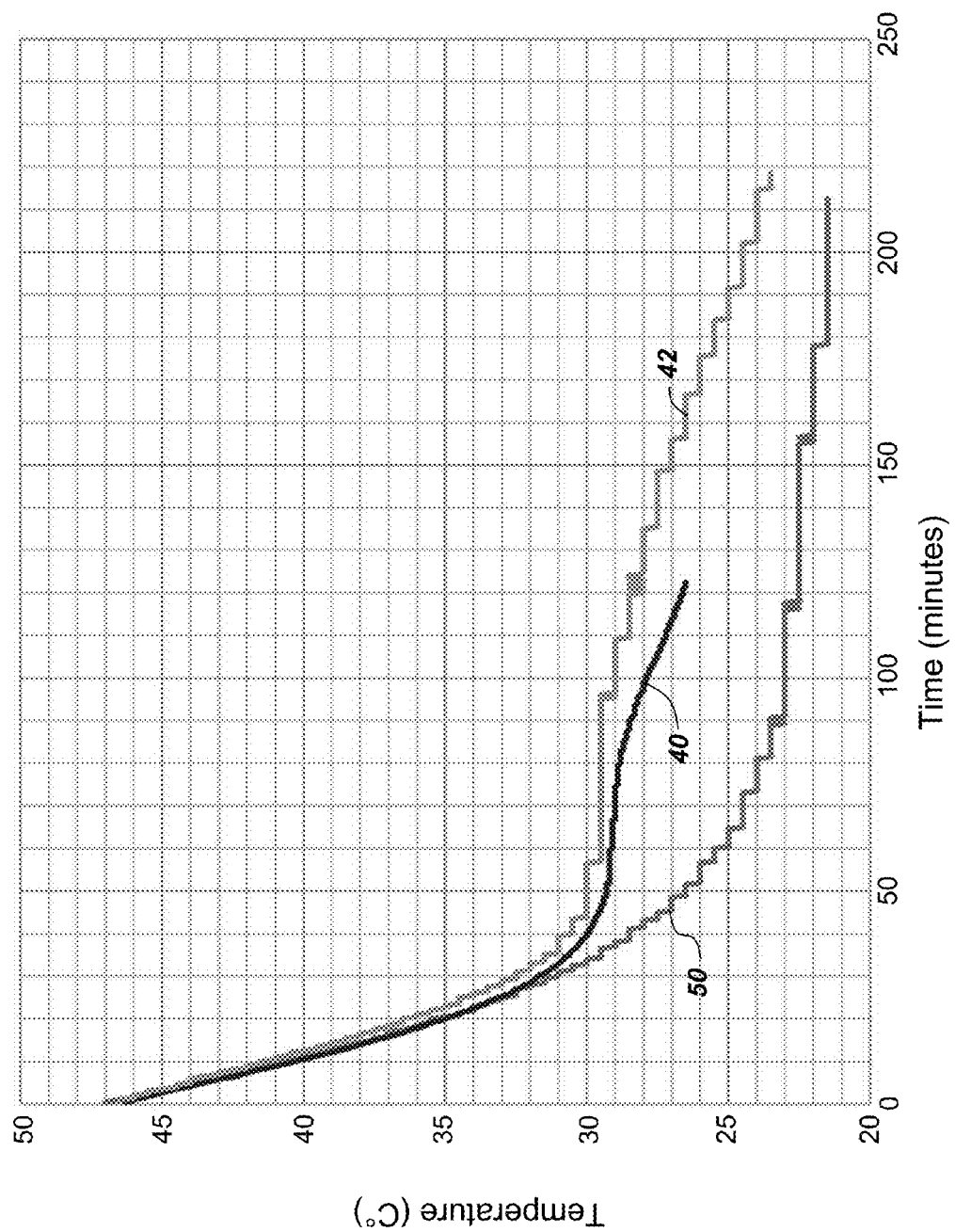
FIG. 6 illustrates the performance characteristics of a model insulation system relative to a control.

The insulation formulation was prepared, cured and tested as described above. The uncured formulation contained approximately 50 grams of the micro encapsulated phase change material MPCM32D purchased from Microtek. FIG. 6 illustrates the cool down behavior of the product insulation 42 relative to the control 50 which contained no phase change material but was otherwise identical to the product insulation. The data shown indicate a divergence of heat loss behavior at approximately 33° C., a temperature close to the nominal melting point of the phase change material present in MPCM32D (32° C.). It was observed that the time required for the product insulation 44 to cool from 47° C. to 23° C. was significantly greater (>200 minutes) than that observed for the control (88 minutes).

Example 3

Figure 7:
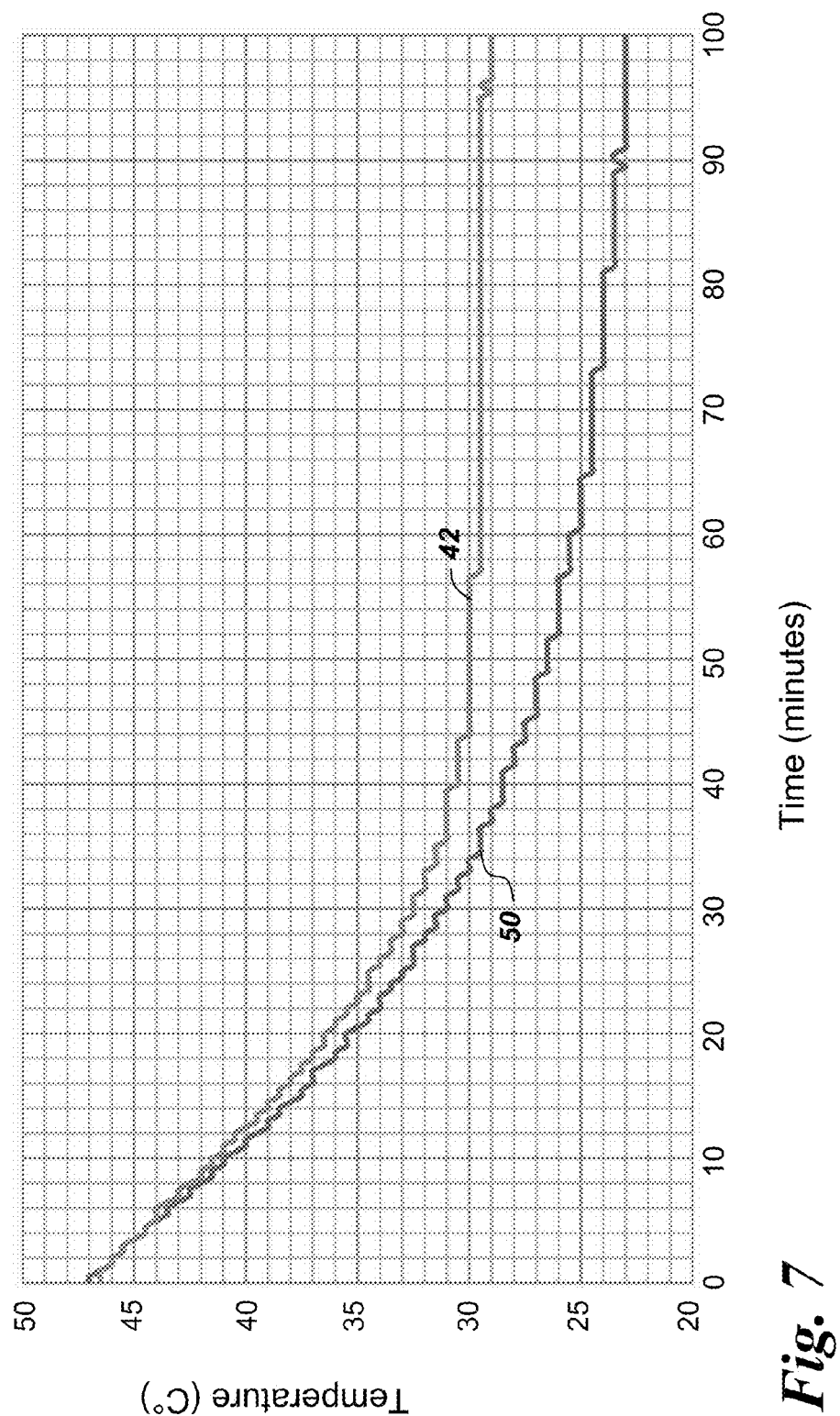
FIG. 7 illustrates the performance characteristics of a model insulation system relative to a control.

The insulation formulation was prepared, cured and tested as described above. The uncured formulation contained approximately 50 grams of the micro encapsulated phase change material MPCM32D purchased from Microtek. FIG. 7 illustrates the cool down behavior of the cured product insulation 42 relative to the control 50 in a 21° C. constant temperature bath. Again, the cool down time of the silicone rubber containing the phase change material was significantly longer than the cool down time exhibited by the control.

Example 4

Figure 8:
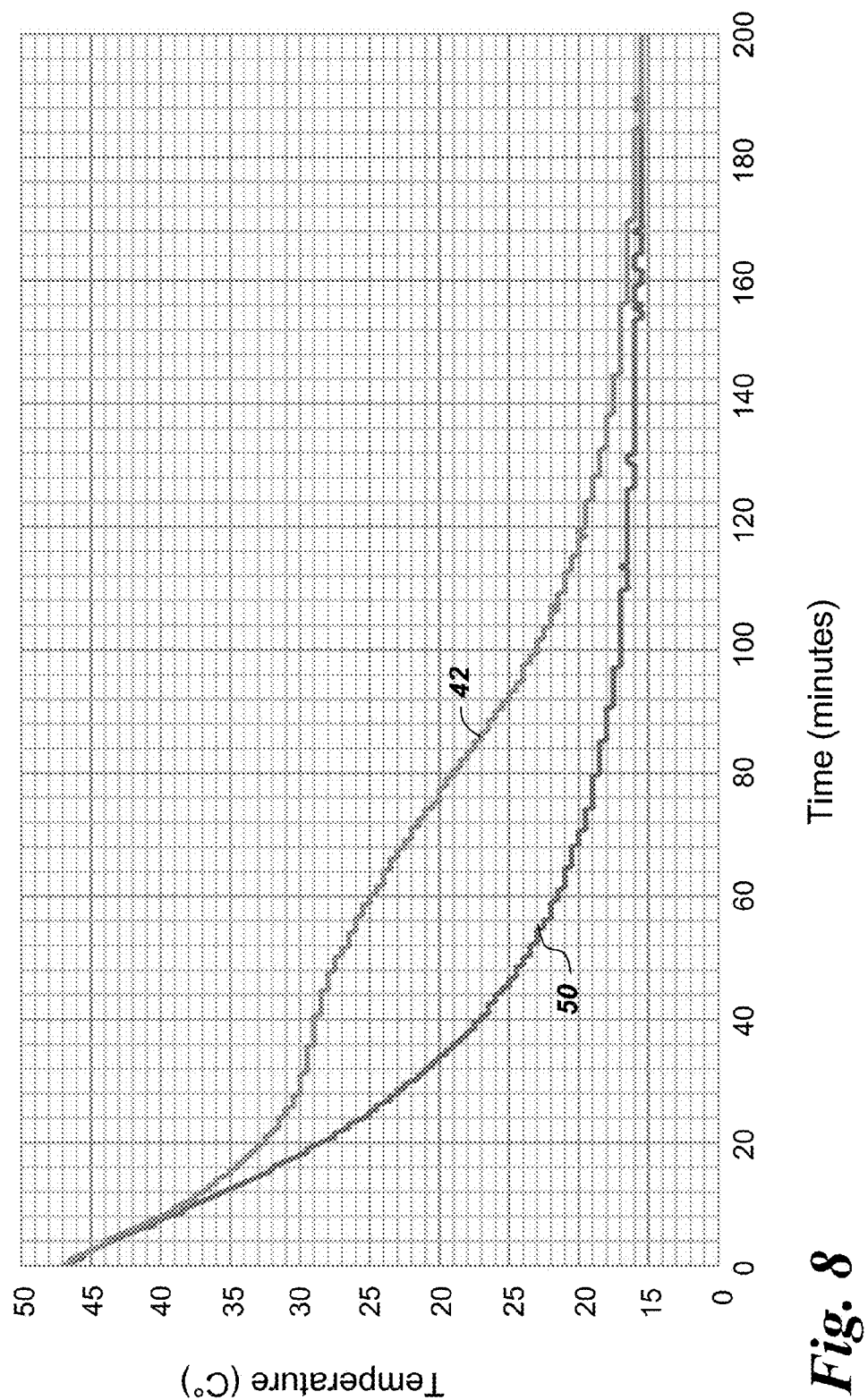
FIG. 8 illustrates the performance characteristics of a model insulation system relative to a control.

The insulation formulation was prepared, cured and tested as described above. The uncured formulation contained approximately 50 grams of the micro encapsulated phase change material MPCM32D purchased from Microtek. FIG. 8 illustrates the cool down behavior of the cured product insulation 44 relative to the control 50 in a 4° C. constant temperature bath. Again, the cool down time of the silicone rubber containing the phase change material was significantly longer than the cool down time exhibited by the control. It was observed as well that the time required for the cured product 42 to cool from 47° C. to 17° C. was approximately 87 minutes, whereas the control 50 cooled from 47° C. to 17° C. in just 40 minutes.

Example 5

Preparation of an Insulated Pipe Section

A foot-long section of steel pipe approximately 4 inches in diameter and approximately two feet long is coated with the uncured coating formulation of Example 2 while rotating the pipe on a rotary jig to a substantially uniform thickness of approximately one inch in the coated foot long section. The coating is allowed to cure at room temperature overnight to provide an insulated pipe section comprising a first insulating layer comprising a microencapsulated first phase change material dispersed in a silicone rubber first polymer matrix, the phase change material having a melting point $T_1$ of 32° C. In this example, the shells of the microencapsulated first phase change material serve as a barrier layer configured to inhibit migration of the phase first change material from the first polymer matrix. A second uncured coating formulation identical to the first with the exception that a different microencapsulated phase change material, MPCM18 having a melting point $T_2$ of 18° C., is substituted for MCPM32 is then applied to the outer surface of the first insulating layer using a trowel while rotating the pipe on a rotary jig to a substantially uniform thickness of approximately one inch in the coated foot long section. The second insulating layer is then cured over night to afford an insulated fluid conduit having a first insulating layer containing the first phase change material having melting point $T_1$ dispersed in an inner first polymer matrix, and a second insulating layer containing a second phase change material having melting point $T_2$ dispersed in an outer second polymer matrix. In this example, first insulating layer and the second insulating layer are identical with respect to the chemical composition of the first polymer matrix and the second polymer matrix, the first insulating layer and the second insulating layer differing only in the identity and properties of the first and second phase change materials.

Example 6

Preparation of an Insulated Pipe Section

The outer surface of a foot-long section of steel pipe approximately 4 inches in diameter and approximately two feet long is coated with an uncured coating formulation prepared from approximately 1 kilogram of an addition curable silicone rubber with 100 grams its curing agent (Dow Corning XTI-1003 RTV Silicone Rubber Insulation) together with 300 grams of the straight chain hydrocarbon tricosane powder (melting point $T_1$=47° C.) while rotating the pipe on a rotary jig to a substantially uniform thickness of approximately one inch in the coated foot long section. The coating is allowed to cure at room temperature overnight to provide an intermediate comprising the pipe and the first insulating layer comprising the cured silicone rubber and the Tricosane phase change material. A layer comprising Addisil UV 60 EX available from Momentive is then applied to the outer surface of the first insulating layer and cured while rotating the pipe under an ultraviolet lamp to provide the insulated pipe section comprising both the first insulating layer and a barrier layer configured to inhibit migration of the first phase change material from the first insulating layer into the environment. A formulation identical to the formulation the corresponding to the first insulating layer, with the exception that eicosane powder (melting point $T_2$=36° C.) is substituted for tricosane powder, is then applied in the same manner atop the first insulating layer-barrier layer combination. This second coating is allowed to cure at room temperature overnight. A second barrier layer identical to the first applied barrier layer is then applied to the second insulating layer and cured as before to afford the product insulated fluid conduit.

Example 7

Preparation of an Insulating Article Comprising Phase Change Material

ULTEM polyetherimide foam (Sabic Innovative Plastics) was infiltrated with molten phase change material following the methodology disclosed in the standard test method ASTM C 830. At ambient temperature a rectangular piece of ULTEM foam was weighed and placed in a 3 neck kettle flask containing the phase change material PCM 32 (500 grams), a 50:50 mixture of octadecane and eicosane (mp 32° C.). A weight was placed atop the foam piece to assure its full submersion once the phase change material became molten. The kettle was sealed and evacuated and the temperature of was raised to melt the solid phase change material and thereafter stabilized at about 38° C. The kettle was heated until no further bubbling from the ULTEM foam was observed at which time the infiltrated foam was removed from the molten phase change material. The surfaces of the infiltrated ULTEM foam were wiped with absorbent paper to remove molten phase change material from the surface of the foam and the foam was weighed. The estimated void content was between 89 and 91%.

Performance Simulation

The performance of various embodiments of the present invention was evaluated using MATLAB modeling software on model insulated fluid conduit systems. A finite difference numerical scheme was employed to solve the energy equation in a radial coordinate system with respect to time. Phase change materials in the insulating layers are modeled by appropriately adjusting thermal conductivity, density, and heat capacity thermo-physical properties during the change of phase of the material.

The model system had the following geometric characteristics. The insulated fluid conduit was a cylindrical insulated pipe having a 6.6 inch inner diameter and a uniform wall thickness of 0.86 inches. Two insulating layers were present, a first insulating layer having a uniform thickness of 1 inch adjacent to the outer surface of the pipe, and a second insulating layer having a uniform thickness of 1 inch disposed upon the outer surface of the first insulating layer.

The model system had the following thermos-physical characteristics. The fluid in the conduit was a gas having an initial temperature of 65° C. and the ambient temperature surrounding the insulated fluid conduit was 4° C. For the purposes of the modeling experiment 20° C. was considered the critical temperature at which the fluid within the insulated fluid conduit would undergo a deleterious phase change, in this instance natural gas hydrate formation. The fluid within the insulated fluid conduit was modeled as a gas having a density of 35.5 kilograms per cubic meter, a specific heat of 2446 Joules per kilogram per (degree) kelvin (J/kg° K) and a thermal conductivity of 45 Watts per meter per (degree) kelvin (W/m° K).

The first and second insulating layers were modeled as a first matrix comprising the first phase change material having a phase change temperature of $T_1$ and a second matrix comprising the second phase change material having a phase change temperature of $T_2$ (See Table 2 for values of $T_1$ and $T_2$ modeled). The densities of the first insulating layer and the second insulating layers were both 948.4 kilograms per cubic meter (kg/m³) below the relevant phase change temperature, and 924.4 (kg/m³) above the relevant phase change temperature. The specific heats of the first and second insulating layers were both 1726.8 (J/kg° K) below the relevant phase change temperature, and 1726.8 (J/kg° K) above the relevant phase change temperature. The thermal conductivities of the first and second insulating layers were both 0.3028 (W/m° K) below the relevant phase change temperature, and 0.1768 (W/m° K) above the relevant phase change temperature. The latent heat of each of the first insulating layer and the second insulating layer was 225000 Joules per kilogram.

TABLE 2

Predicted Cool-Down Times for model Systems 1-6

| Entry | T1 | T2 | T1 − T2 | Predicted Cool-down Time (hours) From 65° C. to 20° C. |
|---|---|---|---|---|
| 1 | 40 | 20 | 20 | 9 |
| 2 | 30 | 10 | 20 | 14.1 |
| 3 | 20 | 5 | 15 | 20.3 |
| 4 | 20 | 40 | −20 | 14.8 |
| 5 | 10 | 30 | −20 | 7 |
| 6 | 5 | 20 | −15 | 7.6 |

The data in the form of predicted cool-down times illustrates the effectiveness of the insulating systems provided by the present invention. It should be noted that on average the best insulating characteristics are achieved when the phase change temperature $T_1$ of the first phase change material is higher than the phase change temperature $T_2$ of the second phase change material.

Additional simulations studies were carried out on model systems 7-13 which were analogous to models systems 1-6 above and had the same total insulation thickness, but comprised four insulating layers each comprising a different phase change material. As before, the first insulating layer contains the phase change material having melting point $T_1$ and is in direct contact with the outer surface of the model conduit. A second insulating layer comprising a second phase change material having melting point $T_2$ is disposed directly on the outer surface of the first insulating layer. A third insulating layer comprising a third phase change material having melting point $T_3$ is disposed directly on the outer surface of the second insulating layer. A forth insulating layer comprising a forth phase change material having melting point $T_4$ is disposed directly on the outer surface of the third insulating layer. The predicted cool down times indicate a modest improvement of the four-layer system relative to similarly configured two layer systems.

TABLE 3

Predicted Cool-Down Times for model Systems 7-13

| Entry | T1 | T2 | T3 | T4 | T1 − T4 | Predicted Cool-down Time (hours) From 65° C. to 20° C. |
|---|---|---|---|---|---|---|
| 7 | 25 | 20 | 15 | 5 | 20 | 19.6 |
| 8 | 20 | 10 | 15 | 5 | 15 | 19.2 |
| 9 | 20 | 20 | 15 | 5 | 15 | 21.4 |
| 10 | 20 | 20 | 10 | 10 | 10 | 19.1 |
| 11 | 20 | 20 | 10 | 5 | 15 | 21 |
| 12 | 20 | 18 | 10 | 5 | 15 | 21.6 |
| 13 | 20 | 18 | 15 | 5 | 15 | 21.9 |

The foregoing examples are merely illustrative, serving to illustrate only some of the features of the invention. The appended claims are intended to claim the invention as broadly as it has been conceived and the examples herein presented are illustrative of selected embodiments from a manifold of all possible embodiments. Accordingly, it is Applicants' intention that the appended claims are not to be limited by the choice of examples utilized to illustrate features of the present invention. As used in the claims, the word "comprises" and its grammatical variants logically also subtend and include phrases of varying and differing extent such as for example, but not limited thereto, "consisting essentially of" and "consisting of." Where necessary, ranges have been supplied, those ranges are inclusive of all sub-ranges there between. It is to be expected that variations in these ranges will suggest themselves to a practitioner having ordinary skill in the art and where not already dedicated to the public, those variations should where possible be construed to be covered by the appended claims. It is also anticipated that advances in science and technology will make equivalents and substitutions possible that are not now contemplated by reason of the imprecision of language and these variations should also be construed where possible to be covered by the appended claims.

What is claimed is:

1. An insulated fluid conduit comprising:
   (a) a conduit inner surface defining a flow channel;
   (b) a conduit outer surface;
   (c) a first insulating layer comprising a first phase change material dispersed in a first polymer matrix;
   (d) a second insulating layer disposed upon the first insulating layer, the second insulating layer comprising a second phase change material dispersed in a second polymer matrix;
   wherein the first polymer matrix is configured as an open cell foam defining a network of voids and wherein the first phase change material is disposed therein the voids and including at least one barrier layer disposed on an outermost surface of the first polymer matrix to inhibit migration of the first phase change material into the environment and the second polymer matrix is configured as a continuous phase and wherein the second phase change material is dispersed within the second polymer matrix as a microencapsulated discontinuous phase, wherein at least one barrier layer surrounds the second phase change material in discrete domains dispersed within the second polymer matrix to inhibit migration of the second phase change material into the environment, and wherein the continuous phase of the second polymer matrix is an outermost layer of the insulated fluid conduit; or
   wherein the first polymer matrix is configured as a continuous phase and wherein the first phase change material is dispersed within the first polymer matrix as a microencapsulated discontinuous phase, wherein at least one barrier layer surrounds the first phase change material in discrete domains dispersed within the first polymer matrix and wherein the second polymer matrix is configured as an open cell foam defining a network of voids and wherein the second phase change material is disposed therein the voids and including at least one barrier layer disposed on an outermost surface of the second polymer matrix to inhibit migration of the second phase change material into the environment, and wherein the at least one barrier layer is an outermost layer of the insulated fluid conduit, and
   wherein the first phase change material has a melting point $T_1$ and the second phase change material has a melting point $T_2$, and $T_1$ is greater than $T_2$.

2. The insulated fluid conduit according to claim 1, wherein least one of the first polymer matrix, the second polymer matrix and the at least one barrier layer comprises a silicone rubber.

3. The insulated fluid conduit according to claim 1, wherein at least one of the first polymer matrix and the second polymer matrix comprises a polyolefin.

4. The insulated fluid conduit according to claim 1, wherein at least one of the first polymer matrix, the second polymer matrix and the at least one barrier layer comprises a polyurethane.

5. The insulated fluid conduit according to claim 1, wherein at least one of the first polymer matrix, the second polymer matrix and the at least one barrier layer comprises a polyepoxide.

6. The insulated fluid conduit according to claim 1, wherein at least one of the first polymer matrix, the second polymer matrix and the at least one barrier layer comprises a polyimide.

7. The insulated fluid conduit according to claim 1, wherein at least one of the first polymer matrix, the second polymer matrix and the at least one barrier layer comprises a polyetherimide.

8. The insulated fluid conduit according to claim 1, wherein the at least one barrier layer comprises a silicone material which is impermeable with respect to the phase change material.

9. The insulated fluid conduit according to claim 1, wherein at least one of the first phase change material and the second phase change material is dispersed in a polymeric matrix configured as an open cell foam.

10. The insulated fluid conduit according to claim 1, wherein at least one of the first phase change material and the second phase change material comprises a normal hydrocarbon selected from the group consisting of hexadecane, octadecane, and eicosane.

11. The insulated fluid conduit according to claim 1, which is a component of oil field equipment selected from the group consisting of insulated pipes, insulated valves, insulated manifolds, insulated joints, insulated Christmas trees, insulated risers and insulated tie-backs.

12. The insulated fluid conduit according to claim 1, wherein a thermally conductive layer is disposed between the conduit outer surface and the first insulating layer.

13. An insulated fluid conduit comprising:
(a) a conduit inner surface defining a flow channel;
(b) a conduit outer surface;
(c) a first insulating layer comprising a silicone rubber and a first phase change material, wherein the silicon rubber of the first insulating layer is configured as an open cell foam defining a network of voids and wherein the first phase change material is disposed therein the voids and including at least one barrier layer disposed on an outermost surface of the silicon rubber to inhibit migration of the first phase change material into the environment; and
(d) a second insulating layer comprising a silicone rubber and a second phase change material, wherein the silicon rubber of the second insulating layer is configured as a continuous phase and wherein the second phase change material is dispersed within the silicone rubber as a microencapsulated discontinuous phase, wherein at least one barrier layer surrounds the second phase change material of the second insulating layer in discrete domains dispersed within the silicone rubber to inhibit migration of the second phase change material into the environment, and wherein the continuous phase of the silicon rubber of the second insulating layer is an outermost layer of the insulated fluid conduit;

wherein the first phase change material has a melting point $T_1$ and the second phase change material has a melting point $T_2$, and $T_1$ is greater than $T_2$.

14. An insulated fluid conduit comprising:
(a) a conduit inner surface defining a flow channel;
(b) a conduit outer surface;
(c) a first insulating layer comprising a first phase change material dispersed in a first polymeric matrix; and
(d) a second insulating layer comprising a second phase change material dispersed in a second polymeric matrix;
wherein the first phase change material has a melting point $T_1$ and the second phase change material has a melting point $T_2$, wherein $T_1$ is greater than $T_2$, and
wherein at least one of the first polymeric matrix and the second polymeric matrix is configured as an open cell foam defining a network of voids and wherein a respective one of the first phase change material and the second phase change material is disposed therein the voids and including at least one barrier layer disposed on an outermost surface of the at least one of the first polymeric matrix and the second polymeric matrix to inhibit migration of the respective one of the first phase change material and the second phase change material into the environment, and
wherein the other of the first polymeric matrix and the second polymeric matrix is configured as a continuous phase and wherein a respective one of the first phase change material and the second phase change material is dispersed therein as a microencapsulated discontinuous phase, wherein at least one barrier layer surrounds the respective one of the first phase change material and the second phase change material in discrete domains dispersed within the respective one of the first polymeric matrix and the second polymeric matrix, and wherein the continuous phase is an outermost layer of the insulated fluid conduit.

15. The insulated fluid conduit according to claim 14, wherein at least one of the first polymeric matrix and the second polymeric matrix comprises a polyether imide.

* * * * *